(12) United States Patent
Kita

(10) Patent No.: US 12,457,149 B2
(45) Date of Patent: Oct. 28, 2025

(54) ESTIMATION OF ROUTER THAT IS CAUSE OF SILENT FAILURES

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/574,745

(22) PCT Filed: Mar. 16, 2023

(86) PCT No.: PCT/JP2023/010378
§ 371 (c)(1),
(2) Date: Dec. 28, 2023

(87) PCT Pub. No.: WO2024/189911
PCT Pub. Date: Sep. 19, 2024

(65) Prior Publication Data
US 2025/0088409 A1    Mar. 13, 2025

(51) Int. Cl.
*H04L 41/0631*    (2022.01)
*H04L 43/091*    (2022.01)

(52) U.S. Cl.
CPC ........ *H04L 41/0631* (2013.01); *H04L 43/091* (2022.05)

(58) Field of Classification Search
CPC ............... H04L 41/0631; H04L 43/091
See application file for complete search history.

(56) References Cited

U.S. PATENT DOCUMENTS

| | | | |
|---|---|---|---|
| 2010/0124165 A1* | 5/2010 | Yang | H04L 43/16 370/217 |
| 2023/0040676 A1 | 2/2023 | Kita et al. | |
| 2023/0087341 A1* | 3/2023 | Zheng | H04W 28/0983 370/329 |

FOREIGN PATENT DOCUMENTS

| WO | 2021171210 A1 | 9/2021 |
|---|---|---|
| WO | WO-2024161499 A1 * | 8/2024 |
| WO | WO-2024189911 A1 * | 9/2024 |

* cited by examiner

*Primary Examiner* — Philip C Lee
(74) *Attorney, Agent, or Firm* — HAUPTMAN HAM, LLP

(57) ABSTRACT

Provided are a router estimation system and a router estimation method which enable accurate estimation of a router in network slices that is a cause of a silent failure. A policy manager (90) extracts, when it is determined that a plurality of function elements have deteriorated in performance in slice communication, a plurality of function elements that are similar to one another in terms of shifts in performance in the slice communication from the plurality of function elements determined to have deteriorated in performance. The policy manager (90) identifies, for each of the plurality of extracted function elements, a group of routers located on a route of the slice communication based on router group data. The policy manager (90) estimates at least one router included in every router group identified for the each of the plurality of extracted function elements to be a router that is a cause of the deterioration of performance of the plurality of extracted function elements.

18 Claims, 11 Drawing Sheets

FIG.8

| FUNCTION ELEMENT ID | SLICE ID | SEGMENT ROUTING PATH ID LIST |
|---|---|---|
| gNB001 | 001 | 001,002,003,··· |
| gNB001 | 002 | 011,012,013,··· |
| gNB001 | 003 | 021,022,023,··· |
| gNB002 | 001 | 101,102,103,··· |
| gNB002 | 002 | 111,112,113,··· |
| gNB002 | 003 | 121,122,123,··· |
| gNB003 | 001 | 201,202,203,··· |
| gNB003 | 002 | 211,212,213,··· |
| gNB003 | 003 | 221,222,223,··· |

FIG.9

| SEGMENT ROUTING PATH ID | ROUTER ID LIST |
|---|---|
| 011 | 10000,10001,10002,···,20001,20002,··· |
| 012 | 10000,10011,10012,··· |
| 013 | 10000,10021,10022,··· |
| 101 | 11000,11001,11002,··· |
| 102 | 11000,11011,11012,···,20001,20002,··· |
| 103 | 11000,11021,11022,··· |
| 221 | 12000,12001,12002,··· |
| 222 | 12000,12011,12012,··· |
| 223 | 12000,12021,12022,···,20001,20003,··· |

ESTIMATION OF ROUTER THAT IS CAUSE OF SILENT FAILURES

RELATED APPLICATIONS

The present application is a National Phase of International Application Number PCT/JP2023/010378, filed Mar. 16, 2023.

TECHNICAL FIELD

The present disclosure relates to estimation of a router that is a cause of silent failures.

BACKGROUND ART

In Patent Literature 1, there is described deployment of a plurality of network functions (NEs) included in a network service (NS) on a server in which a container-type application execution environment is installed. In Patent Literature 1, there are also described construction of network slices and monitoring of the NFs.

CITATION LIST

Patent Literature

[Patent Literature 1] WO 2021/171210 A1

SUMMARY OF INVENTION

Technical Problem

In a communication system as described in Patent Literature 1, it is common to set a separate group of routers for each of the network slices as components. There is also a case in which a shared router is set as a component of a plurality of network slices.

Sometimes, despite detection of no trouble in a router that is a component shared by a plurality of network slices included in the communication system, a plurality of function elements (NSes, NEs, and the like) experience deterioration of performance (so-called silent failure) in communication that use network slices available to the function elements. A cause of such a silent failure is difficult to ascertain.

The present disclosure has been made in view of the circumstance described above, and an object of the present disclosure is to provide a router estimation system and a router estimation method which enable accurate estimation of a router in network slices that is a cause of a silent failure.

Solution to Problem

According to one embodiment of the present disclosure, there is provided a router estimation system including one or more processors, the router estimation system causing at least one of the one or more processors to execute a router group data storing process, a determination process, an extraction process, a router group identification process, and a router estimation process. In the router group data storing process, for each one of a plurality of network slices constructed in a communication system, router group data indicating a group of routers that form the each one of the plurality of network slices is stored. In the determination process, for each one of a plurality of function elements included in the communication system, and for each network slice available to the each one of the plurality of function elements, whether performance of the each one of the plurality of function elements in slice communication using the each network slice has deteriorated is determined. In the extraction process, when it is determined that a plurality of function elements out of the plurality of function elements included in the communication system have deteriorated in performance in the slice communication, a plurality of function elements that are similar to one another in terms of shifts in performance in the slice communication are extracted from the plurality of function elements determined to have deteriorated in performance. In the router group identification process, for each of the plurality of extracted function elements, a group of routers located on a route of the slice communication is identified based on the router group data. In the router estimation process, at least one router included in every router group identified for the each of the plurality of extracted function elements is estimated to be a router that is a cause of the deterioration of performance of the plurality of extracted function elements.

Further, according to one embodiment of the present disclosure, there is provided a router estimation method including storing, for each one of a plurality of network slices constructed in a communication system, router group data indicating a group of routers that form the each one of the plurality of network slices. The router estimation method also includes determining, for each one of a plurality of function elements included in the communication system, and for each network slice available to the each one of the plurality of function elements, whether performance of the each one of the plurality of function elements in slice communication using the each network slice has deteriorated. The router estimation method also includes extracting, when it is determined that a plurality of function elements out of the plurality of function elements included in the communication system have deteriorated in performance in the slice communication, a plurality of function elements that are similar to one another in terms of shifts in performance in the slice communication from the plurality of function elements determined to have deteriorated in performance. The router estimation method also includes identifying, for each of the plurality of extracted function elements, a group of routers located on a route of the slice communication based on the router group data. The router estimation method also includes estimating at least one router included in every router group identified for the each of the plurality of extracted function elements to be a router that is a cause of the deterioration of performance of the plurality of extracted function elements.

BRIEF DESCRIPTION OF DRAWINGS

FIG. 8 is a table for showing an example of segment routing path management data.

FIG. 9 is a table for showing an example of router group management data.

DESCRIPTION OF EMBODIMENTS

One embodiment of the present invention is now described in detail with reference to the drawings.

Figure 1:
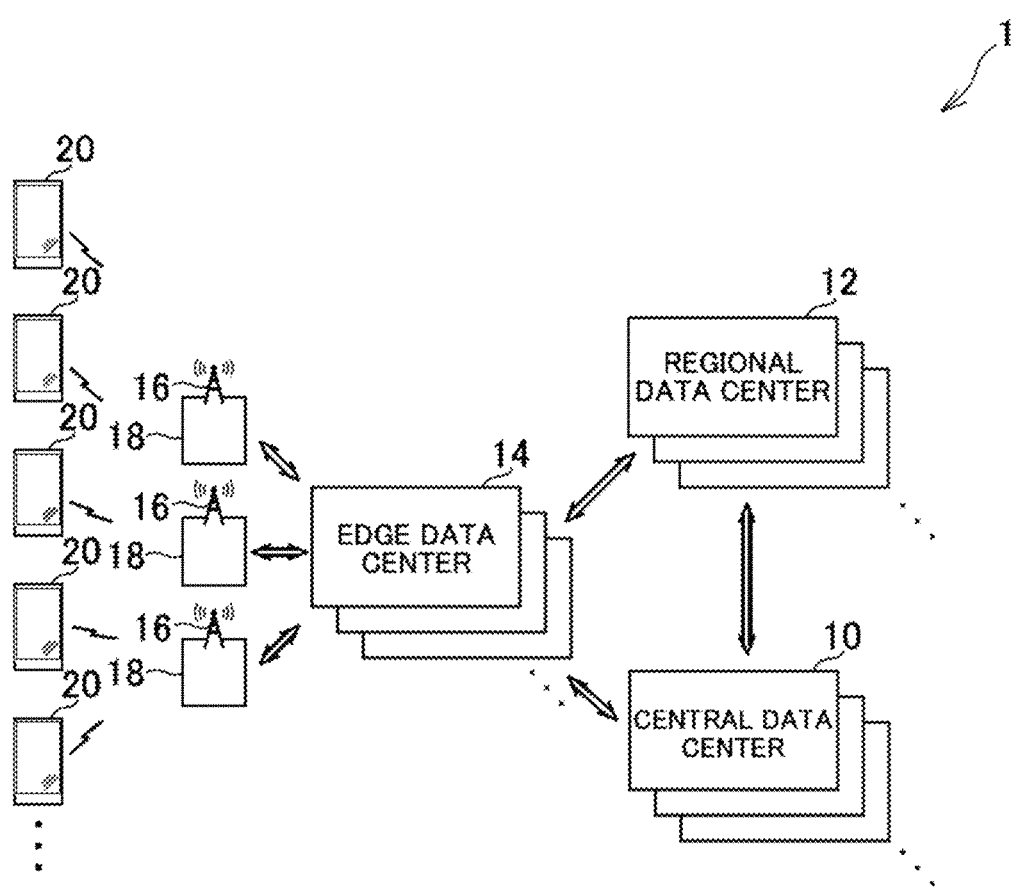
FIG. 1 is a diagram for illustrating an example of a communication system in one embodiment of the present invention.
Figure 2:
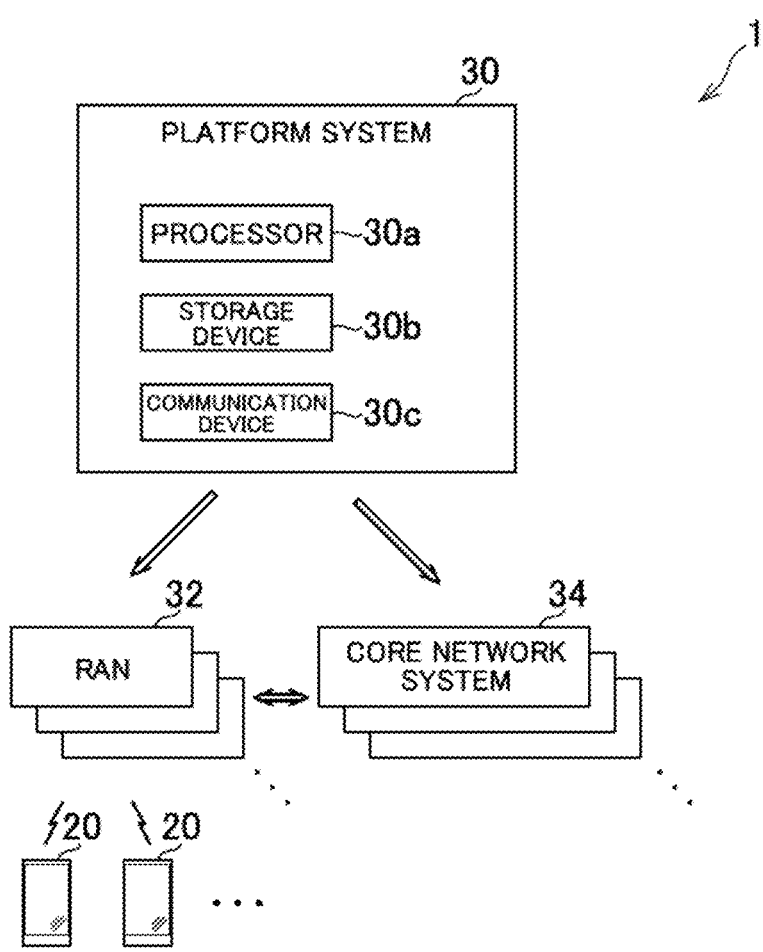
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to and from a communication facility 18 provided with an antenna 16. Here, as illustrated in FIG. 1, one edge data center 14 may be capable of communicating to and from several communication facilities 18. The communication facility 18 may include a computer such as a server computer. The communication facility 18 in the present embodiment performs radio communication to and from a user equipment (UE) 20 via the antenna 16. For example, a radio unit (RU) described later is arranged in the communication facility 18 provided with the antenna 16.

A plurality of servers are arranged in each of the central data centers 10, the regional data centers 12, and the edge data centers 14 in the present embodiment.

In the present embodiment, for example, the central data centers 10, the regional data centers 12, and the edge data centers 14 can communicate to and from one another. Communication can also be performed between the central data centers 10, between the regional data centers 12, and between the edge data centers 14.

As illustrated in FIG. 2, the communication system 1 in the present embodiment includes a platform system 30, a plurality of radio access networks (RANs) 32, a plurality of core network systems 34, and a plurality of UEs 20. The core network systems 34, the RANs 32, and the UEs 20 cooperate with each other to implement a mobile communication network.

The RANs 32 are each a computer system which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANS 32 in the present embodiment are implemented mainly by server groups arranged in the edge data centers 14 and the communication facilities 18. A part of the RANs 32 (for example, distributed unit (DU), central unit (CU), virtual distributed unit (vDU), or virtual central unit (vCU)) may be implemented by the central data center 10, the regional data center 12, or the communication facility 18 instead of the edge data center 14.

The core network systems 34 are each a system corresponding to an evolved packet core (EPC) in 4G or a 5G core (5GC) in 5G. The core network systems 34 in the present embodiment are implemented mainly by server groups arranged in the central data centers 10 or the regional data centers 12.

The platform system 30 in the present embodiment is configured, for example, on a cloud platform and includes a processor 30a, a storage device 30b, and a communication device 30c, as illustrated in FIG. 2. The processor 30a is a program control device such as a microprocessor which operates in accordance with a program installed in the platform system 30. The storage device 30b is, for example, a storage element such as a ROM or RAM, a solid state drive (SSD), a hard disk drive (HDD), or the like. The storage device 30b stores a program to be executed by the processor 30a, and the like. The communication device 30c is, for example, a communication interface, such as a network interface controller (NIC) or a wireless local area network (LAN) module. Software-defined networking (SDN) may be implemented in the communication device 30c. The communication device 30c exchanges data with the RAN 32 and the core network system 34.

In the present embodiment, the platform system 30 is implemented by a server group arranged in the central data center 10. The platform system 30 may be implemented by a server group arranged in the regional data center 12.

In the present embodiment, for example, in response to a purchase request for a network service (NS) by a purchaser, the network service for which the purchase request has been made is constructed in the RAN 32 or the core network system 34. Then, the constructed network service is provided to the purchaser.

For example, a network service such as a voice communication service, a data communication service, or the like, is provided to the purchaser who is a mobile virtual network operator (MVNO). The voice communication service or the data communication service provided in the present embodiment is eventually provided to a customer (end user) for the purchaser (MVNO in the above-mentioned example), who uses the UE 20 illustrated in FIG. 1 and FIG. 2. The end user can perform voice communication or data communication to and from other users via the RAN 32 or the core network system 34. The UE 20 of the end user can also access a data network such as the Internet via the RAN 32 or the core network system 34.

In addition, in the present embodiment, an Internet of things (IoT) service may be provided to an end user who uses a robot arm, a connected car, or the like. In such a case, an end user who uses, for example, a robot arm, a connected car, or the like may be a purchaser of the network service in the present embodiment.

In the present embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

The network service provided to the purchaser in the present embodiment is formed of one or a plurality of functional units (for example, network function (NF)). In the present embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in the present description. The present embodiment is described on the assumption that the network service is implemented by one or a plurality of CNFs. The functional unit in the present embodiment may also correspond to a network node.

Figure 3:
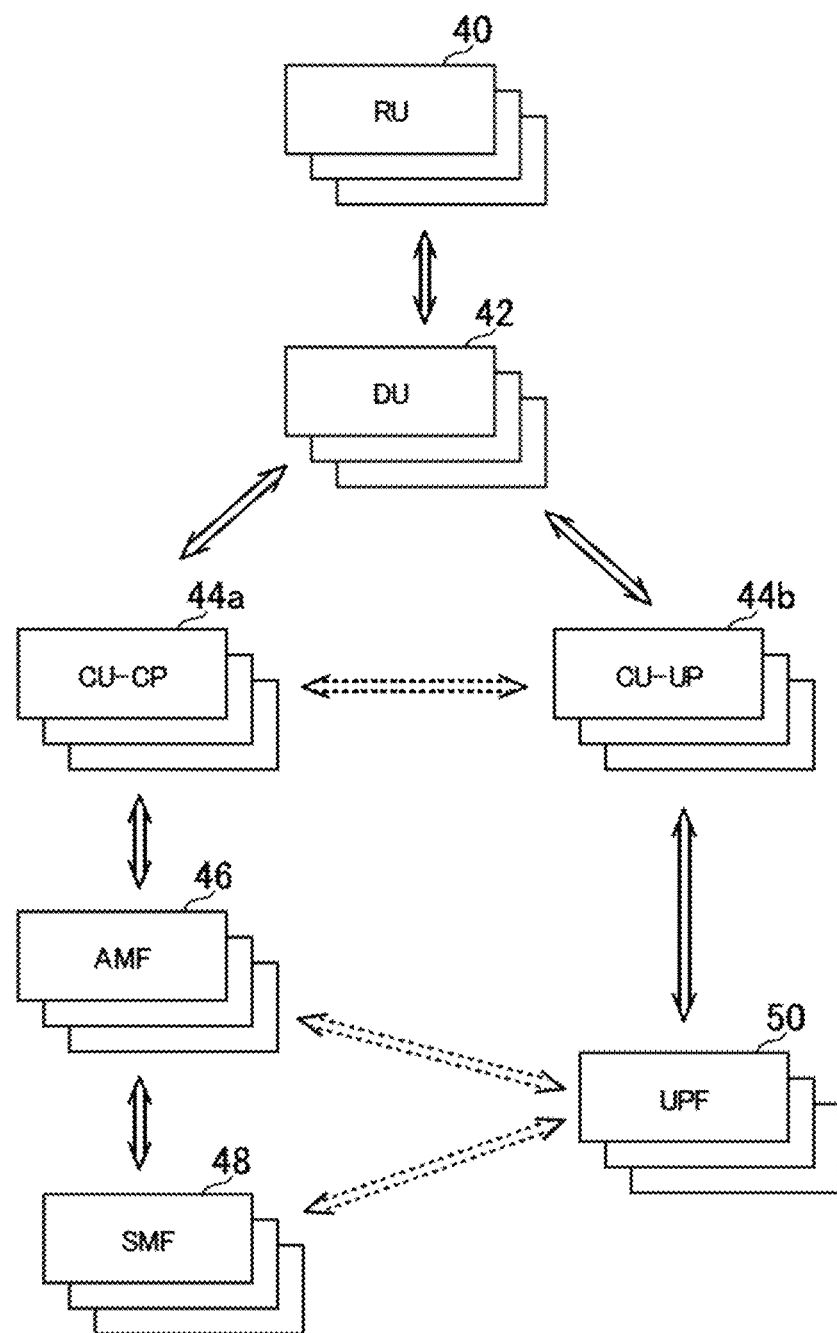
FIG. 3 is a diagram for schematically illustrating an example of a network service in the one embodiment of the present invention.

FIG. 3 is a diagram for schematically illustrating an example of an operating network service. The network service illustrated in FIG. 3 includes NFs, such as a plurality of RUS 40, a plurality of DUs 42, a plurality of CUs 44 (central unit-control planes (CU-CPs) 44a and central unit-user planes (CU-UPs) 44b), a plurality of access and mobility management functions (AMFs) 46, a plurality of session management functions (SMFs) 48, and a plurality of user plane functions (UPFs) 50, as software elements.

In the example of FIG. 3, the RU 40, the DU 42, the CU-CP 44a, the AMF 46, and the SMF 48 correspond to elements of a control plane (C-Plane), and the RU 40, the DU 42, the CU-UP 44b, and the UPF 50 correspond to elements of a user plane (U-Plane).

The network service may include other types of NFs as software elements. In addition, the network service is implemented on a plurality of servers or other computer resources (hardware elements).

Then, in the present embodiment, for example, the network service illustrated in FIG. 3 provides a communication service in a certain area.

Then, in the present embodiment, it is assumed that the plurality of RUs 40, the plurality of DUs 42, the plurality of CU-UP 44b, and the plurality of UPFs 50, which are illustrated in FIG. 3, belong to one end-to-end network slice.

Figure 4:
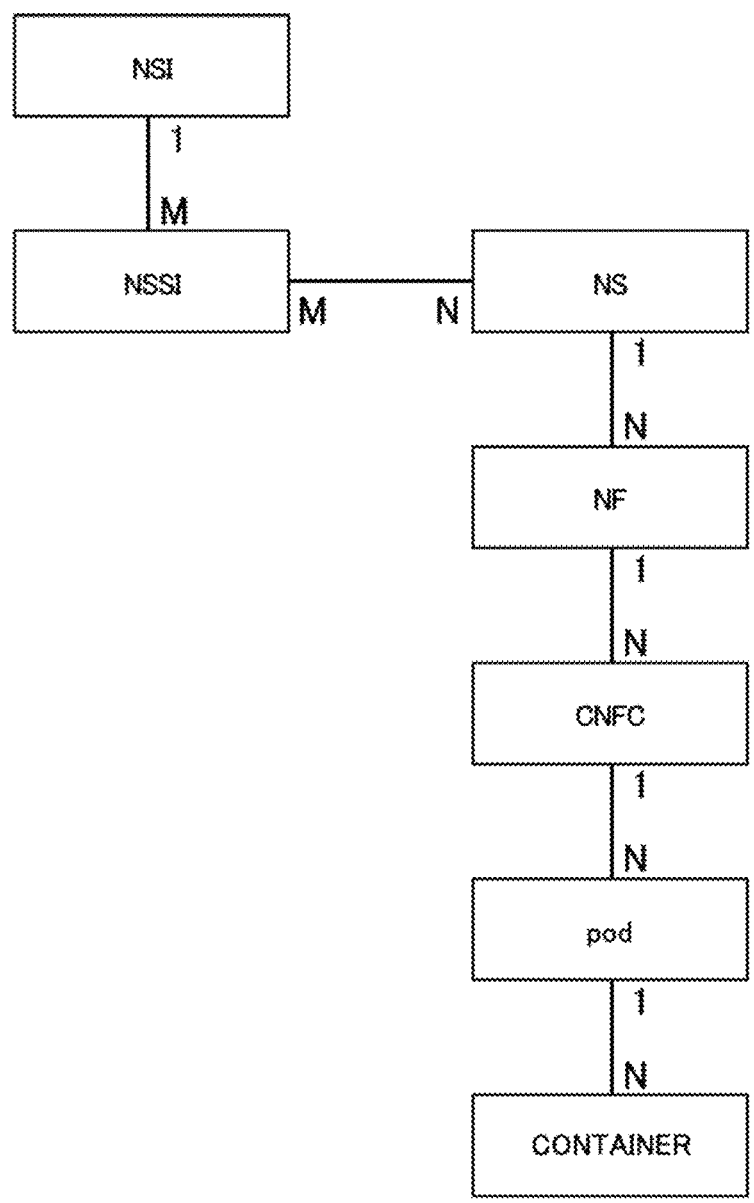
FIG. 4 is a diagram for illustrating an example of links between elements constructed in the communication system in the one embodiment of the present invention.

FIG. 4 is a diagram for schematically illustrating an example of links between elements constructed in the communication system 1 in the present embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NFs. Here, the NS may correspond to an element having a granularity, for example, a 5GC, an EPC, a 5G RAN (gNB), or a 4G RAN (eNB).

In 5G, the NF corresponds to an element having a granularity, for example, the RU, the DU, the CU-CP, the CU-UP, the AMF, the SMF, or the UPF. In 4G, the NF corresponds to an element having a granularity, for example, a mobility management entity (MME), a home subscriber server (HSS), a serving gateway (S-GW), a vDU, or a vCU. In the present embodiment, for example, one NS includes one or a plurality of NFs. That is, one or a plurality of NFs are under the control of one NS.

The CNFC corresponds to an element having a granularity, for example, DU mgmt or DU processing. The CNFC may be a microservice deployed on a server as one or more containers. For example, some CNFCs may be microservices that provide a part of the functions of the DU, the CU-CP, the CU-UP, and the like. Some CNFCs may be microservices that provide a part of the functions of the UPF, the AMF, the SMF, and the like. In the present embodiment, for example, one NF includes one or a plurality of CNFCs. That is, one or a plurality of CNFCs are under the control of one NF.

The pod refers to, for example, the minimum unit for managing a Docker container by Kubernetes. In the present embodiment, for example, one CNFC includes one or a plurality of pods. That is, one or a plurality of pods are under the control of one CNFC.

In the present embodiment, for example, one pod includes one or a plurality of containers. That is, one or a plurality of containers are under the control of one pod.

In addition, as illustrated in FIG. 4, a network slice (NSI) and a network slice subnet instance (NSSI) have a hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a transport domain such as a mobile backhaul (MBH) domain, or a slice of a core network domain.

In the present embodiment, for example, one NSI includes one or a plurality of NSSIs. That is, one or a plurality of NSSIs are under the control of one NSI. In the present embodiment, a plurality of NSIs may share the same NSSI.

In addition, as illustrated in FIG. 4, the NSSI and the NS generally have a many-to-many relationship.

In addition, in the present embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. Here, the S-NSSAI is information associated with the network slice. The NF is not required to belong to the network slice.

Figure 5:
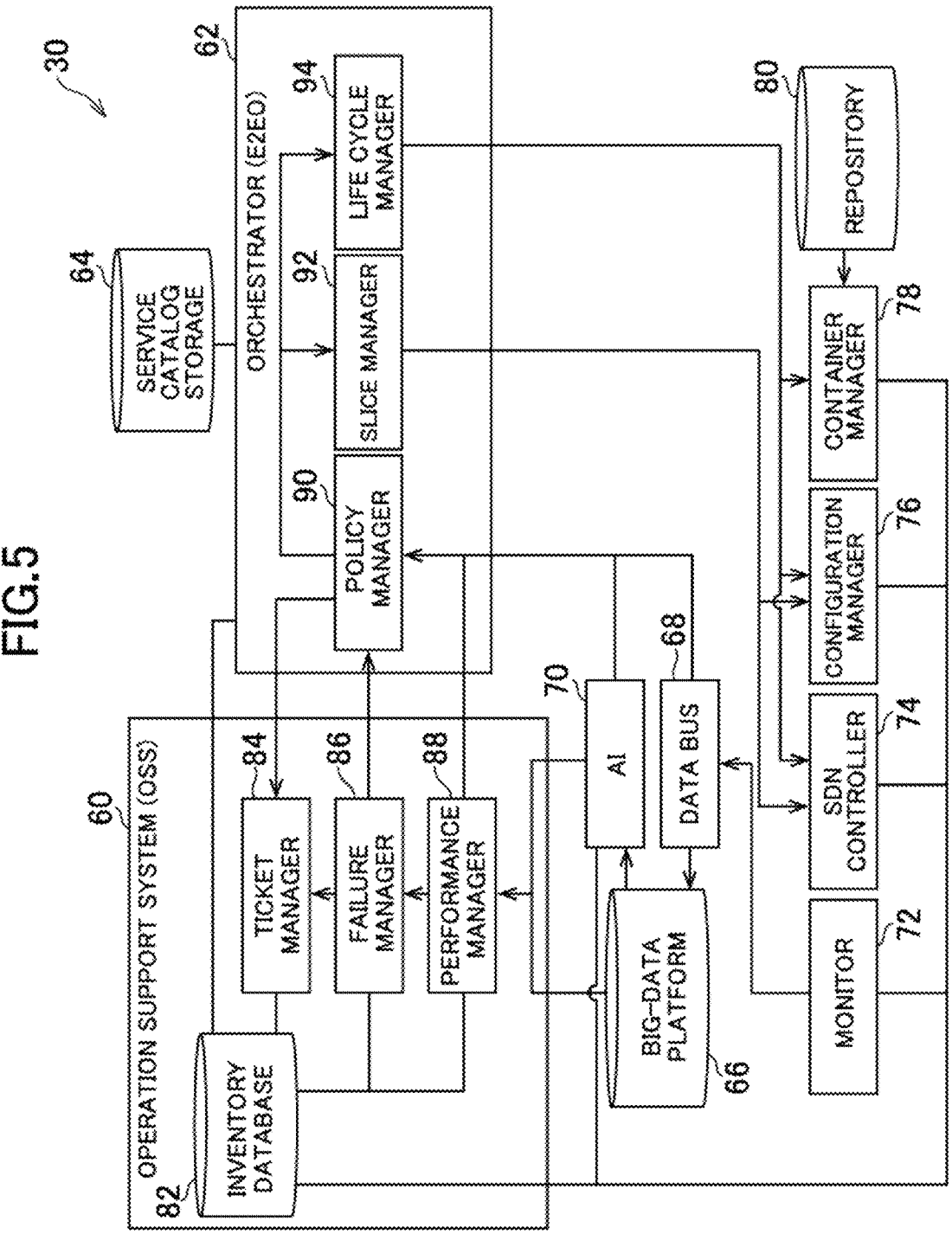
FIG. 5 is a functional block diagram for illustrating an example of functions implemented by a platform system in the one embodiment of the present invention.

FIG. 5 is a functional block diagram for illustrating an example of functions implemented by the platform system 30 in the present embodiment. The platform system 30 in the present embodiment is not required to implement all the functions illustrated in FIG. 5, and may implement functions other than the functions illustrated in FIG. 5.

As illustrated in FIG. 5, the platform system 30 in the present embodiment functionally includes, for example, an operation support system (OSS) 60, an orchestrator (end-to-end-orchestrator (E2EO)) 62, a service catalog storage 64, a big-data platform 66, a data bus 68, an artificial intelligence (AI) 70, a monitor 72, an SDN controller 74, a configuration manager 76, a container manager 78, and a repository 80. The OSS 60 includes an inventory database 82, a ticket manager 84, a failure manager 86, and a performance manager 88. The E2EO 62 includes a policy manager 90, a slice manager 92, and a life cycle manager 94. Those elements are implemented mainly by the processor 30a, the storage device 30b, and the communication device 30c.

The functions illustrated in FIG. 5 may be implemented by executing, by the processor 30a, a program that is installed in the platform system 30, which is one or a plurality of computers, and that includes instructions corresponding to the functions. The program may be supplied to the platform system 30 via a computer-readable information storage medium such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art would understand that the functions illustrated in FIG. 5 can be implemented in various forms by only hardware, by only software, or by a combination of hardware and software.

The container manager 78 executes life cycle management of a container. For example, the life cycle management includes processes relating to the construction of the container such as the deployment and setting of the container.

Here, the platform system 30 in the present embodiment may include a plurality of container managers 78. In each of the plurality of container managers 78, a container management tool such as Kubernetes, and a package manager such as Helm may be installed. Each of the plurality of container managers 78 may execute the construction of a container such as the deployment of the container for a server group (for example, Kubernetes cluster) associated with the container manager 78.

The container manager 78 is not required to be included in the platform system 30. The container manager 78 may be provided in, for example, a server (that is, the RAN 32 or the core network system 34) managed by the container manager 78, or another server that is annexed to the server managed by the container manager 78.

In the present embodiment, the repository 80 stores, for example, a container image of a container included in a functional unit group (for example, NF group) that achieves a network service.

The inventory database 82 is a database in which inventory information is stored. The inventory information includes, for example, information on a server arranged in the RAN 32 or the core network system 34 and managed by the platform system 30.

In addition, in the present embodiment, the inventory database 82 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

Figure 6:
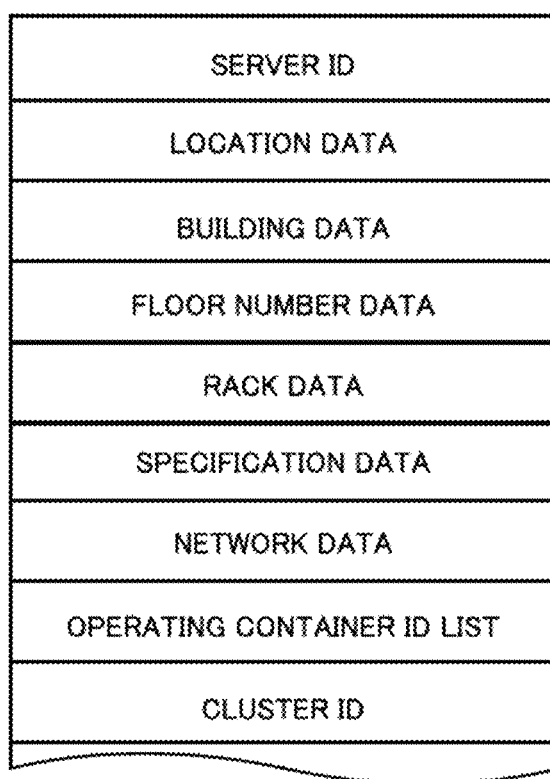
FIG. 6 is a diagram for illustrating an example of data structure of physical inventory data.

FIG. 6 is a diagram for illustrating an example of data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is, for example, data indicating the specifications of the server associated with the physical inventory data. The specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

The logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NEs under the control of the certain NS. In addition, for example, the logical inventory data includes topology data including an identifier of a certain network slice and an identifier of one or a plurality of NFs belonging to the certain network slice.

The inventory data may also include data indicated by the current status of, for example, a geographical relationship or a topological relationship between the elements included in the communication system 1. As described above, the inventory data includes location data indicating locations at which the elements included in the communication system 1 are operating, that is, the current locations of the elements included in the communication system m 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such an identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF. The NF data indicates, for example, attributes such as an identifier of an instance of the NF and the type of the NF. The logical inventory data may also include CNFC data indicating information relating to the CNFC. The CNFC data indicates, for example, attributes such as an identifier of an instance and the type of the CNFC. The logical inventory data may also include pod data indicating information relating to the pod included in the CNFC. The pod data indicates, for example, attributes such as an identifier of an instance of the pod and the type of the pod. The logical inventory data may also include container data indicating information relating to the container included in the pod. The container data indicates, for example, attributes such as a container ID of an instance of the container and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the NF data may include data indicating the IP address and the host name of an NF indicated by the NF data.

The logical inventory data may also include data indicating NSSAI including one or a plurality of pieces of S-NS-SAI, which is set for each NF.

In addition, the inventory database 82 can appropriately grasp the resource status in cooperation with the container manager 78. Then, the inventory database 82 appropriately updates the inventory data stored in the inventory database 82 based on the latest resource status.

Further, for example, the inventory database 82 updates the inventory data stored in the inventory database 82 in accordance with execution of an action, such as construction of a new element included in the communication system 1, a change of a configuration of the elements included in the communication system 1, scaling of the elements included in the communication system 1, or replacement of the elements included in the communication system 1.

The service catalog storage 64 stores service catalog data. The service catalog data may include, for example, service template data indicating the logic to be used by the life cycle manager 94 or the like. The service template data includes information required for constructing the network service. For example, the service template data includes information defining the NS, the NF, and the CNFC and information indicating an NS-NF-CNFC correspondence relationship. Further, for example, the service template data contains a workflow script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNEs or other functional units included in the network service for each type thereof. The NSD may also indicate a file name of a CNED described later, which relates to the CNF included in the network service.

Further, a CNF descriptor (CNFD) is an example of the service template data. The CNFD may indicate computer resources (for example, CPU, memory, and hard disk drive) required by the CNF. For example, the CNED may also indicate, for each of a plurality of containers included in the CNF, computer resources (CPU, memory, hard disk drive, and the like) required by the container.

The service catalog data may also include information to be used by the policy manager 90, the information relating to a threshold value (for example, threshold value for abnormality detection) to be compared to the calculated performance index value. The performance index value is described later.

The service catalog data may also include, for example, slice template data. The slice template data includes information required for executing instantiation of the network slice, and includes, for example, the logic to be used by the slice manager 92.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In the present embodiment, for example, the life cycle manager 94 constructs a new network service for which a purchase request has been made in response to the purchase request for the NS by the purchaser.

The life cycle manager 94 may execute, for example, the workflow script associated with the network service to be purchased in response to the purchase request. Then, the life cycle manager 94 may execute the workflow script, to thereby instruct the container manager 78 to deploy the container included in the new network service to be purchased. Then, the container manager 78 may acquire the container image of the container from the repository 80 and deploy a container corresponding to the container image in the server.

In addition, in the present embodiment, the life cycle manager 94 executes, for example, scaling or replacement of the element included in the communication system 1. Here, the life cycle manager 94 may output a container deployment instruction or deletion instruction to the container manager 78. Then, the container manager 78 may execute, for example, a process of deploying a container or a process of deleting a container in accordance with the instruction. In the present embodiment, the life cycle manager 94 can execute such scaling and replacement that cannot be handled by Kubernetes of the container manager 78 or other tools.

The life cycle manager 94 may also output an instruction to create a communication route to the SDN controller 74. For example, the life cycle manager 94 presents, to the SDN controller 74, two IP addresses at both ends of a communication route to be created, and the SDN controller 74 creates a communication route connecting those two IP addresses to each other. The created communication route may be managed so as to be linked to those two IP addresses.

The life cycle manager 94 may also output, to the SDN controller 74, an instruction to create a communication route between two IP addresses linked to the two IP addresses.

In the present embodiment, the slice manager 92 executes, for example, instantiation of a network slice. In the present embodiment, the slice manager 92 executes, for example, instantiation of a network slice by executing the logic indicated by the slice template stored in the service catalog storage 64.

The slice manager 92 includes, for example, a network slice management function (NSMF) and a network slice sub-network management function (NSSMF) described in the Third Generation Partnership Project (3GPP) (trademark) specification "TS28 533." The NSMF is a function of generating and managing network slices, and provides an NSI management service. The NSSME is a function of generating and managing network slice subnets forming a part of a network slice, and provides an NSSI management service.

The slice manager 92 may output a configuration management instruction related to the instantiation of the network slice to the configuration manager 76. Then, the configuration manager 76 may execute configuration management such as settings in accordance with the configuration management instruction.

The slice manager 92 may also present, to the SDN controller 74, two IP addresses to output an instruction to create a communication route between those two IP addresses.

In the present embodiment, for example, the configuration manager 76 executes configuration management such as settings of the element group including the NEs in accordance with the configuration management instruction received from the life cycle manager 94 or the slice manager 92.

In the present embodiment, for example, the SDN controller 74 creates the communication route between the two IP addresses linked to the creation instruction in accordance with the instruction to create the communication route, which has been received from the life cycle manager 94 or the slice manager 92. The SDN controller 74 may create a communication route between two IP addresses through use of, for example, a publicly known path calculation method such as Flex Algo.

Here, for example, the SDN controller 74 may use a segment routing technology (for example, segment routing IPV6 (SRv6)) to construct an NSI and NSSI for the server or an aggregation router present between communication routes. In addition, the SDN controller 74 may generate an NSI and NSSI extending over a plurality of NFs to be set by issuing, to the plurality of NFS to be set, a command to set a common virtual local area network (VLAN) and a command to assign a bandwidth and a priority indicated by the setting information to the VLAN.

The SDN controller 74 may, for example, change the maximum value of the bandwidth that can be used for communication between two IP addresses without constructing a network slice.

The platform system 30 in the present embodiment may include a plurality of SDN controllers 74. Each of the plurality of SDN controllers 74 may execute a process such as the creation of a communication route for a network device group including the aggregation routers associated with the SDN controller 74.

In the present embodiment, the SDN controller 74 may appropriately change the created communication route. For example, the SDN controller 74 may detect occurrence of a failure in a network device associated with the SDN controller 74, and in response to the detection, may switch the communication route that is created by the SDN controller 74 to run through the network device to a communication route that does not run through the network device.

The life cycle manager 94 or the slice manager 92 may output a change instruction to change a communication route to the SDN controller 74. The SDN controller 74 may follow the change instruction to change a communication route created by the SDN controller 74.

For example, the life cycle manager 94 or the slice manager 92 may output, to the SDN controller 74, a change instruction to change a communication route linked to an identifier of a network device to be excluded from a communication route. When receiving the change instruction, the SDN controller 74 may switch a communication route created by the SDN controller 74 to a communication route from which the network device identified by the identifier linked to the change instruction is excluded (that is, a communication route that does not run through the network device identified by the identifier linked to the change instruction).

In the present embodiment, the monitor 72 monitors, for example, the element group included in the communication system 1 based on a given management policy. Here, for example, the monitor 72 may monitor the element group based on a monitoring policy designated by the purchaser when the purchaser purchases the network service.

In the present embodiment, the monitor 72 executes monitoring at various levels, for example, a slice level, an NS level, an NF level, a CNFC level, and a level of hardware such as the server.

For example, the monitor 72 may set a module that outputs metric data in the hardware such as the server or a software element included in the communication system 1 so that monitoring can be performed at the various levels described above. Here, for example, the NF may output the metric data indicating a metric that can be measured (that can be identified) by the NF to the monitor 72. Further, the server may output the metric data indicating a metric relating to the hardware that can be measured (that can be identified) by the server to the monitor 72.

In addition, for example, the monitor 72 may deploy, in the server, a sidecar container that aggregates the metric data indicating the metrics output from a plurality of containers in units of CNFCs (microservices). The sidecar container may include an agent called "exporter." The monitor 72 may repeatedly execute a process of acquiring the metric data aggregated in units of microservices from the sidecar container, at predetermined monitoring intervals through use of the mechanism of a monitoring tool such as Prometheus that can monitor a container management tool such as Kubernetes.

The monitor 72 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitor 72 may acquire metric data indicating the performance index values to be monitored.

Then, in the present embodiment, the monitor 72 executes, for example, a process (enrichment) of aggregating the metric data in predetermined aggregation units, to thereby generate performance index value data indicating the performance index values of the elements included in the communication system 1 in the aggregation units.

For example, for one gNB, the metric data indicating the metrics of the elements (for example, network nodes such as the DUs 42 and the CUs 44) under the control of the gNB are aggregated, to thereby generate the performance index value data on the gNB. In such a manner, the performance index value data indicating communication performance in an area covered by the gNB is generated. Here, for example, the performance index value data indicating a plurality of types of communication performance, such as a traffic amount (throughput) and latency, may be generated for each gNB. In addition, the metric data indicating the metrics of a certain element (for example, DU 42) during a predetermined period may be aggregated, to thereby generate the performance index value data indicating the communication performance of the element during the predetermined period. The communication performance indicated by the performance index value data is not limited to the traffic amount and the latency.

Then, the monitor 72 outputs, to the data bus 68, the performance index value data generated by the above-mentioned enrichment.

In the present embodiment, the data bus 68 receives, for example, the performance index value data output from the monitor 72. Then, the data bus 68 generates, based on one or a plurality of pieces of performance index value data that have been received, a performance index value file including the one or the plurality of pieces of performance index value data. Then, the data bus 68 outputs the generated performance index value file to the big-data platform 66.

Further, the elements, such as the network slice, the NS, the NF, the CNFC, that are included in the communication system 1 and the hardware such as the server notify the monitor 72 of various alerts (for example, notify the monitor 72 of an alert with the occurrence of a failure as a trigger).

Then, for example, when the monitor 72 receives the above-mentioned notification of the alert, the monitor 72 outputs alert message data indicating the notification to the data bus 68. Then, the data bus 68 generates an alert file obtained by combining one or a plurality of pieces of alert message data each indicating the notification into one file, and outputs the alert file to the big-data platform 66.

In the present embodiment, the big-data platform 66 accumulates, for example, the performance index value files and the alert files that have been output from the data bus 68.

In the present embodiment, for example, the AI 70 stores in advance a plurality of trained machine learning models. The AI 70 uses various machine learning models stored in the AI 70 to execute an estimation process such as a future prediction process for a use status and quality of service of the communication system 1. The AI 70 may generate estimation result data indicating results of the estimation process.

The AI 70 may execute the estimation process based on the files accumulated in the big-data platform 66 and the above-mentioned machine learning models. The estimation process is suitable when long-term trend prediction is performed infrequently.

The AI 70 can also acquire the performance index value data stored in the data bus 68. The AI 70 may execute the estimation process based on the performance index value data stored in the data bus 68 and the above-mentioned machine learning models. The estimation process is suitable when short-term prediction is performed frequently.

In the present embodiment, for example, the performance manager 88 calculates, based on a plurality of pieces of metric data, a performance index value (for example, KPI) that is based on metrics indicated by those pieces of metric data. The performance manager 88 may calculate a performance index value (for example, performance index value relating to an end-to-end network slice) which is a comprehensive evaluation of a plurality of types of metrics and cannot be calculated from a single piece of metric data. The performance manager 88 may generate comprehensive performance index value data indicating a performance index value being a comprehensive evaluation.

The performance manager 88 may acquire the above-mentioned performance index value file from the big-data platform 66. The performance manager 88 may also acquire the estimation result data from the AI 70. Then, the performance index value such as the KPI may be calculated based on at least one of the performance index value file or the estimation result data. The performance manager 88 may acquire the metric data directly from the monitor 72. Then, the performance index value such as the KPI may be calculated based on the metric data.

In the present embodiment, the failure manager 86 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure manager 86 may detect, for example, the occurrence of a failure that cannot be detected from a single piece of metric data or a single notification of the alert, based on a predetermined logic. The failure manager 86 may also generate detection failure data indicating the detected failure.

The failure manager 86 may acquire the metric data and the notification of the alert directly from the monitor 72. The failure manager 86 may also acquire the performance index value file and the alert file from the big-data platform 66. The failure manager 86 may also acquire the alert message data from the data bus 68.

In the present embodiment, the policy manager 90 executes a predetermined determination process based on, for example, at least any one of the above-mentioned metric data, the above-mentioned performance index value data, the above-mentioned alert message data, the above-mentioned performance index value file, the above-mentioned alert file, the above-mentioned estimation result data, the above-mentioned comprehensive performance index value data, or the above-mentioned detection failure data.

Then, the policy manager 90 may execute an action corresponding to a result of the determination process. For example, the policy manager 90 may output an instruction to construct a network slice to the slice manager 92. In addition, for example, the policy manager 90 may output, to the slice manager 92, an instruction to switch the communication route. The policy manager 90 may also output an instruction for scaling or replacement of the elements to the life cycle manager 94 based on the result of the determination process.

The policy manager 90 in the present embodiment can acquire the performance index value data stored in the data bus 68. Then, the policy manager 90 may execute the predetermined determination process based on the performance index value data acquired from the data bus 68. The policy manager 90 may also execute the predetermined determination process based on the alert message data stored in the data bus 68.

In the present embodiment, the ticket manager 84 generates, for example, a ticket indicating information to be notified to an administrator of the communication system 1. The ticket manager 84 may generate a ticket indicating details of the detection failure data. The ticket manager 84 may also generate a ticket indicating a value of the performance index value data or the metric data. The ticket manager 84 may also generate a ticket indicating a determination result obtained by the policy manager 90.

Then, the ticket manager 84 notifies the administrator of the communication system 1 of the generated ticket. The ticket manager 84 may transmit, for example, an email to which the generated ticket is attached to an email address of the administrator of the communication system 1.

In the communication system 1 in the present embodiment, there may occur deterioration of the performance (so-called silent failure) of, for example, NSes and NFs, without an abnormality such as a failure being detected.

Now, an example of countermeasures to be taken against occurrence of a silent failure executed in the platform system 30 in the present embodiment is described. Elements in which a communication function is implemented, such as NSes and NFs, are hereinafter referred to as "function elements."

In the communication system 1 in the present embodiment, a plurality of network slices are constructed. A separate group of routers is set as components for each of the plurality of network slices constructed in the communication system 1 in the present embodiment. A router shared by the plurality of network slices may be set as a component.

Figure 7:
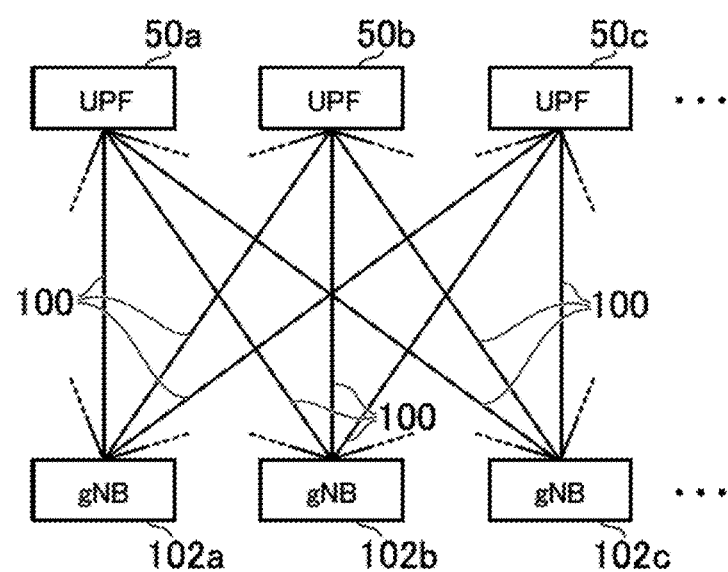
FIG. 7 is a diagram for schematically illustrating an example of a configuration of a group of function elements which hold communication with use of network slices.

FIG. 7 is a diagram for schematically illustrating an example of a configuration of a group of function elements each of which holds communication with use of a network slice that is one of the plurality of network slices constructed in the communication system 1 in the present embodiment.

The network slice illustrated in FIG. 7 includes a plurality of segment routing paths 100 as components. In the present embodiment, each of the plurality of network slices constructed in the communication system 1 may thus include one or a plurality of segment routing paths 100 as components. Packet forwarding by segment routing (for example, packet forwarding by SRv6 or by Segment Routing Multi-Protocol Label Switching (SRMPLS)) is executed on the segment routing paths 100. Each of the plurality of segment routing paths 100 may include routers as components. A router shared by the plurality of segment routing paths 100 may be set as a component.

In the present embodiment, one or a plurality of network slices out of the plurality of network slices constructed in the communication system 1 are available to each one of the function elements included in the communication system 1. The function element included in the communication system 1 can use the network slice available to the function element to hold communication. Communication held by the function element with the use of the network slice available to the function element is hereinafter referred to as "slice communication."

In the example of FIG. 7, the group of function elements which hold communication with the use of the network slice includes a plurality of UPFs 50 (50a, 50b, 50c . . . ) and a plurality of gNBs 102 (102a, 102b, 102c . . . ). The gNBs 102 include the DUs 42 and the CUS 44. The group of function elements which hold communication with the use of the network slice may include other types of function elements (for example, the AMFs 46 and SMFs 48).

In the communication system 1 in the present embodiment, for each of the plurality of network slices constructed in the communication system 1, a group of routers that form the network slice is managed. For example, the inventory database 82 may store, for each of the plurality of network slices constructed in the communication system 1, router group data indicating the group of routers that form the network slice.

The router group data in the present embodiment may include, for example, segment routing path management data exemplified in FIG. 8 and router group management data exemplified in FIG. 9.

The segment routing path management data in the present embodiment is, for example, data indicating one or a plurality of segment routing paths out of the segment routing paths 100 on which packets are forwarded in communication held by a function element with the use of a network slice available to the function element.

As shown in FIG. 8, the segment routing path management data includes, for example, a function element ID, a slice ID, and a segment routing path ID list.

A piece of segment routing path management data links a function element ID which is an identifier of a function element to a slice ID which is an identifier of a network slice available to the function element. The piece of segment routing path management data also links a segment routing path ID list, which is a list of identifiers of the segment routing paths 100 (segment routing path IDs) on which packets are forwarded in communication held by the function element with the use of the network slice.

Identifiers of the gNB 102a, the gNB 102b, and the gNB 102c here are "gNB001," "gNB002," and "gNB003," respectively.

In such a case, the segment routing path management data shown in FIG. 8 indicates that a plurality of network slices including three network slices that have slice IDs "001," "002," and "003" are available to every one of the gNB 102a, the gNB 102b, and the gNB 102c. It is not required to set network slices so that available network slices are common to all function elements. Available network slices may vary from one function element to another function element.

The network slice that has the slice ID "001" is hereinafter referred to as "first network slice." The network slice that has the slice ID "002" is hereinafter referred to as "second network slice." The network slice that has the slice ID "003" is hereinafter referred to as "third network slice."

For example, when slice communication using the first network slice is held by the gNB 102a, the communication is held with use of one of the segment routing paths 100 that has one of "001," "002," "003" . . . as the segment routing path ID. When slice communication using the second network slice is held by the gNB 102a, the communication is held with the use of one of the segment routing paths 100 that has one of "011," "012," "013" . . . as the segment routing path ID. When slice communication using the third network slice is held by the gNB 102*a*, the communication is held with the use of one of the segment routing paths 100 that has one of "021," "022," "023" . . . as the segment routing path ID.

Further, when slice communication using the first network slice is held by the gNB 102*b*, the communication is held with use of one of the segment routing paths 100 that has one of "101," "102," "103" . . . as the segment routing path ID. When slice communication using the second network slice is held by the gNB 102*b*, the communication is held with the use of one of the segment routing paths 100 that has one of "111," "112," "113" . . . as the segment routing path ID. When slice communication using the third network slice is held by the gNB 102*b*, the communication is held with the use of one of the segment routing paths 100 that has one of "121," "122," "123" . . . as the segment routing path ID.

Further, when slice communication using the first network slice is held by the gNB 102*c*, the communication is held with use of one of the segment routing paths 100 that has one of "201," "202," "203" . . . as the segment routing path ID. When slice communication using the second network slice is held by the gNB 102*c*, the communication is held with the use of one of the segment routing paths 100 that has one of "211," "212," "213" . . . as the segment routing path ID. When slice communication using the third network slice is held by the gNB 102*c*, the communication is held with the use of one of the segment routing paths 100 that has one of "221," "222," "223" . . . as the segment routing path ID.

The router group management data in the present embodiment is, for example, data indicating, for each one of the plurality of segment routing paths 100, a group of routers that are components of the segment routing path 100.

As shown in FIG. 9, the router group management data includes, for example, a segment routing path ID and a router ID list. The segment routing path ID is an identifier of one of the segment routing paths 100. As described above, the segment routing path ID corresponds to an element of the segment routing path ID list included in the segment routing path management data. The router group management data links the segment routing path ID to a router ID list, which is a list of identifiers of routers (router IDs) that are components of the one of the segment routing paths 100 that is identified by the segment routing path ID.

For example, the router group management data shown in FIG. 9 indicates that a plurality of routers that form one of the segment routing paths 100 that has the segment routing path ID "011" have identifiers "10000," "10001," "10002" . . . "20001," "20002" . . . . The router group management data also indicates that a plurality of routers that form one of the segment routing paths 100 that has the segment routing path ID "012" have identifiers "10000," "10011," "10012" . . . . The router group management data also indicates that a plurality of routers that form one of the segment routing paths 100 that has the segment routing path ID "013" have identifiers "10000," "10021," "10022" . . . .

The router group management data also indicates that a plurality of routers that form one of the segment routing paths 100 that has the segment routing path ID "101" have identifiers "11000," "11001," "11002" . . . . The router group management data also indicates that a plurality of routers that form one of the segment routing paths 100 that has the segment routing path ID "102" have identifiers "11000," "11011," "11012" . . . "20001," "20002" . . . . The router group management data also indicates that a plurality of routers that form one of the segment routing paths 100 that has the segment routing path ID "103" have identifiers "11000," "11021," "11022" . . . .

The router group management data also indicates that a plurality of routers that form one of the segment routing paths 100 that has the segment routing path ID "221" have identifiers "12000," "12001," "12002" . . . . The router group management data also indicates that a plurality of routers that form one of the segment routing paths 100 that has the segment routing path ID "222" have identifiers "12000," "12011," "12012" . . . . The router group management data also indicates that a plurality of routers that form one of the segment routing paths 100 that has the segment routing path ID "223" have identifiers "12000," "12021," "12022" . . . "20001," "20003".

In the example of FIG. 9, the router that has the router ID "20001" is a component shared by three of the segment routing paths 100 that have the segment routing path IDs "011," "102," and "223." Further, the router that has the router ID "20002" is a component shared by two of the segment routing paths 100 that have the segment routing path IDs "011" and "102."

In the present embodiment, as described above, the slice manager 92, the life cycle manager 94, or the SDN controller 74 may change the segment routing paths 100 that are components of a network slice, or routers that are components of one of the segment routing paths 100.

In the present embodiment, in response to such a change of components, the router group data (for example, the segment routing path management data shown in FIG. 8 or the router group management data shown in FIG. 9) stored in the inventory database 82 is updated.

The segment routing paths 100 that are current components of a network slice or a group of routers that are current components of one of the segment routing paths 100 are accordingly identifiable by referring to the router group data.

In the present embodiment, for example, the monitor 72 monitors, for each of the plurality of function elements included in the communication system 1, and for each network slice available to the function element, performance of the function element in slice communication that uses the network slice.

Specifically, the monitor 72 monitors, for example, performance of the gNB 102*a* in slice communication using the first network slice, performance of the gNB 102*a* in slice communication using the second network slice, performance of the gNB 102*a* in slice communication using the third network slice, performance of the gNB 102*b* in slice communication using the first network slice, performance of the gNB 102*b* in slice communication using the second network slice, performance of the gNB 102*b* in slice communication using the third network slice, performance of the gNB 102*c* in slice communication using the first network slice, performance of the gNB 102*c* in slice communication using the second network slice, and performance of the gNB 102*c* in slice communication using the third network slice.

In the present embodiment, the policy manager 90, for example, then determines, for each of the plurality of function elements included in the communication system 1, and for each network slice available to the function element, whether performance of the function element has deteriorated in slice communication using the network slice.

The policy manager 90 may repeatedly determine whether the performance of the function element has deteriorated in the slice communication. For example, the policy manager 90 may repeatedly determine whether the performance of the function element has deteriorated in the slice communication at a predetermined time interval (for example, an interval of 15 minutes).

For example, the monitor 72 may generate, at a predetermined time interval (for example, an interval of 15 minutes), for each network slice available to a function element, performance index value data indicating performance of the function element in slice communication using the network slice in the immediate last period of the predetermined length of time (for example, the last 15 minutes). The monitor 72 may output the generated performance index value data to the data bus 68 at the time interval.

In response to the output of the performance index value data to the data bus 68, the policy manager 90 may acquire the output performance index value data. The policy manager 90 may determine, based on the performance index value data, whether the performance of the function element has deteriorated in the slice communication using the network slice. In such a manner, whether performance of a function element in slice communication has deteriorated may be determined at a predetermined time interval.

For example, in a case in which a larger value of the performance index value data indicates higher performance, the policy manager 90 may determine that performance of a function element in slice communication has deteriorated when a value of the latest performance index value data indicating the performance of the function element in the slice communication is smaller than a predetermined threshold value.

In a case in which a larger value of the performance index value data indicates lower performance, the policy manager 90 may determine that performance of a function element in slice communication has deteriorated when a value of the latest performance index value data indicating the performance of the function element in the slice communication is larger than a predetermined threshold value.

Examples of the performance indicated by the performance index value data include a bearer connection completion ratio, an abnormal disconnection count, and an abnormal disconnection ratio. A comprehensive value (for example, a linear combination value of a plurality of types of performance index values) calculated based on performance index values that indicate performance of a plurality of types (for example, the bearer connection completion ratio and the abnormal disconnection count) may be used as a value of the performance index value data. The performance indicated by the performance index value data is not limited to those described above, and may be, for example, a throughput or latency.

In the present embodiment, when, for example, it is determined that a plurality of function elements have deteriorated in performance in slice communication, the policy manager 90 extracts a plurality of function elements that are similar to one another in terms of shifts in performance in the slice communication from the plurality of function elements determined to have deteriorated in performance.

The policy manager 90 then identifies, for each one of the plurality of extracted function elements, a group of routers located on a route of the slice communication based on the router group data described above. As described above, the route may be a route on which packets are forwarded by segment routing.

The policy manager 90 may determine, for a plurality of function elements, at the same timing at a predetermined time interval, whether performance in slice communication has deteriorated. The policy manager 90 may then identify a plurality of function elements determined in the latest determination to have deteriorated in performance in slice communication.

The policy manager 90 may then extract a plurality of function elements that are similar to one another in terms of shifts in performance in the slice communication from the plurality of identified function elements. The policy manager 90 may then identify, for each of the plurality of extracted function elements, a group of routers located on a route of the slice communication.

In the present embodiment, the policy manager 90 estimates, for example, at least one router included in every group of routers identified for each one of the plurality of extracted function elements to be a router that is a cause of the deterioration of performance of the plurality of extracted function elements.

For example, it is assumed that performance of the gNB 102*a* is determined to have deteriorated in slice communication using the second network slice in the latest determination. Further, it is assumed that performance of the gNB 102*b* is determined to have deteriorated in slice communication using the first network slice in the latest determination. Further, it is assumed that performance of the gNB 102*c* is determined to have deteriorated in slice communication using the third network slice in the latest determination.

In such a case, the policy manager 90 identifies shifts in performance of the gNB 102*a* in the slice communication using the second network slice, shifts in performance of the gNB 102*b* in the slice communication using the first network slice, and shifts in performance of the gNB 102*c* in the slice communication using the third network slice.

Figure 10A:
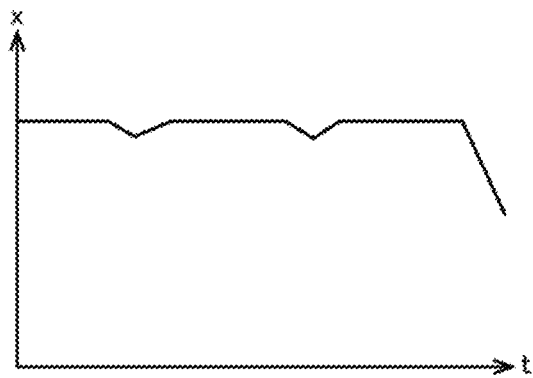
FIG. 10A is a graph for schematically showing an example of shifts in performance of one of the function elements.
Figure 10B:
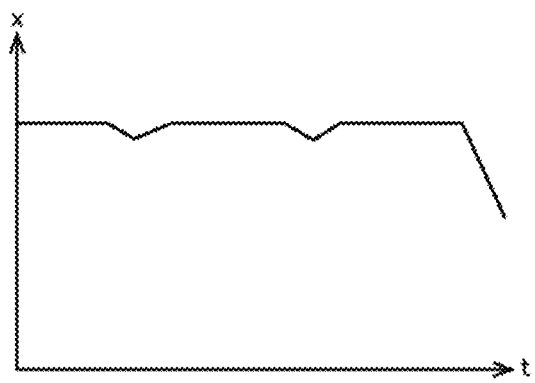
FIG. 10B is a graph for schematically showing an example of shifts in performance of another of the function elements.
Figure 10C:
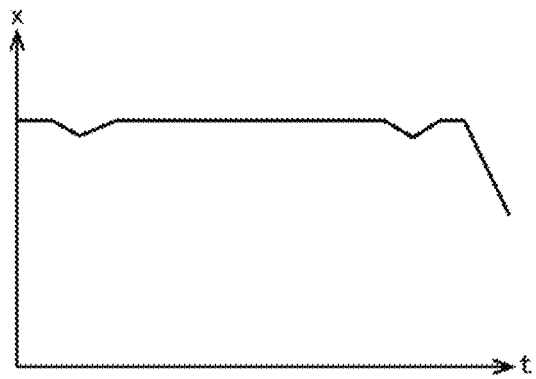
FIG. 10C is a graph for schematically showing an example of shifts in performance of still another of the function elements.

FIG. 10A is a graph for schematically showing an example of shifts in performance of the gNB 102*a* in the slice communication using the second network slice. FIG. 10B is a graph for schematically showing an example of shifts in performance of the gNB 102*b* in the slice communication using the first network slice. FIG. 10C is a graph for schematically showing an example of shifts in performance of the gNB 102*c* in the slice communication using the third network slice.

In FIG. 10A to FIG. 10C, an axis of abscissa indicates a time "t" and an axis of ordinate indicates a performance index value (for example, the bearer connection completion ratio) "x". That is, in each of FIG. 10A to FIG. 10C, a time series of the performance index value in a most recent period (the performance index value at a plurality of most recent time points) is shown.

In the case in which the performance index value data is generated at an interval of 15 minutes as described above, a time series of the performance index value in the immediate last few hours (a time series of values of the performance index value data in the immediate last few hours) may be identified.

Further, the policy manager 90 calculates, for example, in response to the determination that the plurality of function elements have deteriorated in performance in the slice communication, for each pair of function elements out of the plurality of function elements determined to have deteriorated in performance, a degree of similarity between shifts in performance of the pair of function elements in the slice communication.

For example, the policy manager 90 may calculate the degree of similarity between shifts in performance of the gNB 102*a* in the slice communication using the second network slice and shifts in performance of the gNB 102*b* in the slice communication using the first network slice. As the degree of similarity, the policy manager 90 may calculate, for example, a correlation coefficient of correlation between a time series of values of the performance index value data that indicates the performance of the gNB 102a in the slice communication using the second network slice and a time series of values of the performance index value data that indicates the performance of the gNB 102b in the slice communication using the first network slice.

The policy manager 90 may also calculate the degree of similarity between shifts in performance of the gNB 102b in the slice communication using the first network slice and shifts in performance of the gNB 102c in the slice communication using the third network slice. As the degree of similarity, the policy manager 90 may calculate, for example, a correlation coefficient of correlation between a time series of values of the performance index value data that indicates the performance of the gNB 102b in the slice communication using the first network slice and a time series of values of the performance index value data that indicates the performance of the gNB 102c in the slice communication using the third network slice.

The policy manager 90 may also calculate the degree of similarity between shifts in performance of the gNB 102c in the slice communication using the third network slice and shifts in performance of the gNB 102a in the slice communication using the second network slice. As the degree of similarity, the policy manager 90 may calculate, for example, a correlation coefficient of correlation between a time series of values of the performance index value data that indicates the performance of the gNB 102c in the slice communication using the third network slice and a time series of values of the performance index value data that indicates the performance of the gNB 102a in the slice communication using the second network slice.

The degree of similarity described above is not required to be a correlation coefficient, and may be, for example, a reciprocal of a square sum of differences between values of the performance index value data.

The policy manager 90 then extracts, for example, based on the calculated degree of similarity, a plurality of function elements from the plurality of function elements determined to have deteriorated in performance in slice communication.

Here, for example, a first function element and a second function element may be extracted when the degree of similarity between shifts in performance of the first function element in slice communication using a network slice available to the first function element and shifts in performance of the second function element in slice communication using a network slice available to the second function element satisfies a predetermined condition.

The first function element and the second function element may be extracted when, for example, a correlation coefficient of correlation is equal to or more than a predetermined value, the correlation coefficient being between a time series of values of the performance index value data that indicates the performance of the first function element in slice communication using a network slice available to the first function element and a time series of values of the performance index value data that indicates the performance of the second function element in slice communication using a network slice available to the second function element.

Alternatively, a pair of function elements that has one of top predetermined numbers as a magnitude of the correlation coefficient described above may be extracted. A pair of function elements that is within a top predetermined proportion with respect to the magnitude of the correlation coefficient described above may instead be extracted.

A correlation coefficient of correlation between the time series of values of the performance index value data that is shown in FIG. 10A and the time series of values of the performance index value data that is shown in FIG. 10B is represented by r1. Further, a correlation coefficient of correlation between the time series of values of the performance index value data that is shown in FIG. 10B and the time series of values of the performance index value data that is shown in FIG. 10C is represented by r2. Further, a correlation coefficient of correlation between the time series of values of the performance index value data that is shown in FIG. 10A and the time series of values of the performance index value data that is shown in FIG. 10C is represented by r3.

As shown in FIG. 10A to FIG. 10C, the correlation coefficient r1 is substantially 1. The correlation coefficient r2 and the correlation coefficient r3, on the other hand, are smaller than the correlation coefficient r1.

In such a case, for example, the gNB 102a and the gNB 102b may be extracted from the gNB 102a, the gNB 102b, and the gNB 102c which have been determined to have deteriorated in performance in slice communication.

Although two function elements are extracted in the example described above, three or more function elements may be extracted.

As described above, the policy manager 90 then identifies, for each of the gNB 102a and the gNB 102b, a group of routers located on a route of the slice communication based on the router group data described above.

In such a case, for example, for the gNB 102a, segment routing path IDs included in a segment routing path ID list that is linked to the function element ID "gNB001" and the slice ID "002" in the segment routing path management data are identified. The segment routing path IDs identified here are, for example, "011," "012," and "013."

The policy manager 90 then identifies, for each of the thus identified segment routing path IDs, router IDs included in a router ID list that is linked to the segment routing path ID in the router group management data.

Examples of the router ID list identified here include a router ID list that is linked to the segment routing path ID "011" in the router group management data, a router ID list that is linked to the segment routing path ID "012" therein, and a router ID list that is linked to the segment routing path ID "013" therein.

Router IDs included in at least one of the thus identified router ID lists are then identified. A group of router IDs including router IDs identified in such a manner is hereinafter referred to as "cause candidate router ID group." For example, "10000," "10001," "10002," "10011," "10012," "10021," "10022," "20001," "20002" . . . are identified here as a cause candidate router ID group linked to the gNB 102a and the second network slice.

In the same manner, for the gNB 102b, "11000," "11001," "11002," "11011," "11012," "11021," "11022," "20001," "20002" . . . are identified as a cause candidate router ID group linked to the gNB 102b and the first network slice.

The policy manager 90 then identifies at least one router ID that is included in every cause candidate router ID group identified in such a manner for each of the thus extracted plurality of function elements. The policy manager 90 then estimates a router identified by the identified router ID to be a router that is the cause of the deterioration of performance of the function elements.

Here, the cause candidate router ID group linked to the gNB 102a and the second network slice and the cause candidate router ID group linked to the gNB 102b and the first network slice are identified as described above.

In such a case, "20001" and "20002," which are router IDs included in every one of the two cause candidate router ID groups, is thus estimated to be the router ID of a router that is the cause of the deterioration of performance of the function elements.

In the example described above, two routers are estimated to be routers that are causes of the deterioration of performance of the function elements for the sake of convenience of description. However, one router may be estimated to be a cause of deterioration of performance of function elements. Three or more routers may also be estimated to be routers that are causes of deterioration of performance of function elements.

In the present embodiment, for example, the slice manager 92 may output, to the SDN controller 74, for each of the one or the plurality of routers estimated to be the causes of the deterioration of performance of the function elements, a change instruction to change a communication route with respect to a network slice that includes the router as a component. The SDN controller 74 may follow the change instruction to execute a switch to a communication route created by the SDN controller 74.

For example, the slice manager 92 may output, to the SDN controller 74 that is linked to the router estimated to be the cause of the deterioration of performance of the function elements, a change instruction to change a communication route linked to the router ID of the router. When receiving the change instruction, the SDN controller 74 may switch the communication route created by the SDN controller 74 to a communication route from which the router identified by the router ID is excluded (that is, a communication route that does not run through the router).

An administrator or the like of the platform system 30 may check, for each of the routers estimated to be the causes of the deterioration of performance of the function elements, whether the router is experiencing a trouble such as a failure or exceeding of a capacity. The administrator or the like of the platform system 30 may then output, to the SDN controller 74, an instruction to exclude a router for which occurrence of a trouble has been confirmed from the communication route. When receiving the instruction, the SDN controller 74 may switch the communication route created by the SDN controller 74 to a communication route from which the router is excluded (that is, a communication route that does not run through the router).

The SDN controller 74 or the slice manager 92 may update the segment routing path management data shown in FIG. 8 and the router group management data shown in FIG. 9, which are stored in the inventory database 82, based on the switching of the communication routes.

There is a case in which, despite detection of no trouble in a router that is a component shared by a plurality of network slices included in the communication system 1 in the present embodiment, performance of a plurality of function elements deteriorates in communication that uses a network slice available to the function elements (so-called silent failure) as described above.

In the present embodiment, as described above, a plurality of function elements are extracted from a plurality of function elements determined to have deteriorated in performance in slice communication, as function elements that are similar to one another in terms of shifts in performance in the slice communication. For each of the plurality of extracted function elements, a group of routers located on a route of the slice communication is identified. At least one router included in every identified group of routers is then estimated to be a router that is the cause of the deterioration of performance of the function elements.

According to the present embodiment, a router that is a cause of a silent failure in a network slice can accurately be estimated in such a manner.

In the present embodiment, when it is determined that a plurality of function elements have deteriorated in performance in slice communication, the policy manager 90 may extract, from the plurality of function elements determined to have deteriorated in performance, a plurality of function elements that are similar to one another in terms of shifts in performance in a period of the same period type as a period type (for example, time of day or day of the week) to which timing of the determination belongs.

For example, the policy manager 90 considers that day of the week to which timing of determination that a plurality of function elements have deteriorated in performance in slice communication belongs is Sunday. In such a case, the policy manager 90 may identify time series of the performance index value on Sunday out of the immediate last period of a predetermined length. For example, the degree of similarity between the time series may be calculated based on the thus identified time series of the performance index value on Sunday. The plurality of function elements may be extracted based on the thus calculated degree of similarity.

In the manner described above, extraction of function elements that takes into account the period type to which timing of determination that performance of function elements has deteriorated belongs is accomplished.

As described above, when to calculate the degree of similarity in terms of shifts in performance of function elements is not necessarily required to be in response to determination that performance of function elements has deteriorated. The policy manager 90 may extract a plurality of function elements based on the degree of similarity that is calculated prior to determination that performance of function elements has deteriorated.

For example, the degree of similarity may be calculated for every pair of time series of the performance index value at a predetermined time interval. A plurality of function elements may be extracted in response to determination that performance of function elements has deteriorated based on the thus pre-calculated degree of similarity.

As described above, the policy manager 90 may determine whether a function element has deteriorated in performance in slice communication based on a performance index value indicating performance of the function element in the slice communication. In such a case, the policy manager 90 may calculate the degree of similarity described above based on a time series of the performance index value. That is, in the present embodiment, the performance index value used to determine whether performance of a function element has deteriorated and the performance index value used to calculate the degree of similarity may be of the same type.

The type of the performance index value used to determine whether performance of a function element has deteriorated and the type of the performance index value used to calculate the degree of similarity may differ from each other. For example, when determination of whether performance of a function element has deteriorated is based on the bearer connection completion ratio, calculation of the degree of similarity may be based on a throughput. That is, the policy manager 90 may determine whether a function element has deteriorated in performance in slice communication based on a performance index value indicating performance of the function element in the slice communication, and calculate the degree of similarity described above based on time series of a performance index value of a type different from the type of the performance index value used for the determination.

An interval of generation of the performance index value data used to calculate the degree of similarity and an interval of generation of the performance index value data used to determine whether performance of a function element has deteriorated may differ from each other. For example, when the performance index value data used to determine whether performance of a function element has deteriorated is generated at an interval of 15 minutes, the performance index value data used to calculate the degree of similarity may be generated at an interval of 1 minute. The degree of similarity may then be calculated based on time series of 1-minute interval values of the performance index value.

For example, the policy manager 90 may extract a plurality of function elements similar to one another in terms of shifts in performance in slice communication, from function elements determined at least once to have deteriorated in performance in the slice communication out of the immediate last predetermined number of times the determination is executed. For each of the thus extracted plurality of function elements, a group of routers located on a route of the slice communication may then be identified. At least one router included in every group of routers identified in such a manner may then be estimated to be a router that is a cause of the deterioration of performance of the function elements.

For example, it is assumed that determination of whether performance of a function element in slice communication has deteriorated is executed at a predetermined time interval (for example, an interval of 15 minutes). In such a case, a plurality of function elements similar to one another in terms of shifts in performance may be extracted from a plurality of function elements determined at least once to have deteriorated in performance in slice communication out of the immediate last four times the determination is executed (that is, determination executed 45 minutes ago, determination executed 30 minutes ago, determination executed 15 minutes ago, and determination executed at present).

With performance deterioration caused by one router, there may be a lag in timing at which performance deteriorates between function elements, depending on the distance from the router, for example. A router that is a cause of a silent failure in a network slice can accurately be estimated despite such a lag by extracting, as described above, function elements from function elements determined at least once to have deteriorated in performance out of the immediate last predetermined number of times the determination is executed.

The policy manager 90 may determine that performance of a function element in slice communication has deteriorated when a performance index value indicating the performance of the function element in the slice communication satisfies a predetermined condition for a predetermined period.

For example, it is assumed that whether a performance index value indicating performance of a function element in slice communication satisfies a predetermined condition (for example, whether the performance index value is smaller than a threshold value) is determined for every 15 minutes. In such a case, the performance of the function element in slice communication may be determined to have deteriorated when the performance index value in a period from 45 minutes ago to the present satisfies the predetermined condition (that is, when the performance index value is determined to satisfy the predetermined condition in three consecutive times of execution of determination).

In such a manner, a situation in which a function element is determined to have deteriorated in performance when the deterioration of performance is temporary and is not required to be dealt with can be avoided.

The performance manager 88 may generate, by aggregating the performance index value data generated by the monitor 72, for each network slice available to a function element, overall performance index value data indicating performance of the function element in slice communication that uses the network slice. The policy manager 90 may determine, based on the overall performance index value data generated by the performance manager 88, for each network slice available to a function element, whether performance of the function element in slice communication using the network slice has deteriorated.

In the present embodiment, the policy manager 90 may exclude routers located on a route of slice communication of a function element not determined to have deteriorated in performance in the slice communication from routers estimated to be causes of deterioration of performance of a function element.

In the present embodiment, the policy manager 90 may exclude routers located on a route of slice communication of a function element that is not extracted from a plurality of function elements determined to have deteriorated in performance in the slice communication, from routers estimated to be causes of deterioration of performance of a function element.

For example, as described above, it is assumed that the gNB 102*a* and the gNB 102*b* are extracted and the gNB 102*c* is not extracted from the gNB 102*a*, the gNB 102*b*, and the gNB 102*c* which have been determined to have deteriorated in performance in slice communication.

In such a case, routers included in a group of routers that are components of the segment routing paths 100 having the segment routing path IDs "221," "222," and "223" may be identified as routers to be excluded. That is, the routers "12000," "12001," "12002," "12011," "12012," "12021," "12022," "20001," "20003" . . . may be identified as routers to be excluded.

When the routers to be excluded are included among routers estimated to be causes of deterioration of performance of a function element, the policy manager 90 may exclude the routers to be excluded from the routers estimated to be causes of deterioration of performance of a function element.

For example, when router IDs included in every one of cause candidate router ID groups are "20001" and "20002," "20001" may be excluded from router IDs of routers estimated to be causes of deterioration of performance of a function element. In such a case, the router having the router ID "20002" is estimated to be a router that is a cause of deterioration of performance of a function element.

In such a manner, a router that is a cause of a silent failure in a network slice can be estimated more accurately.

In the examples given above, for each network slice available to function elements (the gNBs 102 in the examples described above) included in the RANs 32, whether performance of function elements has deteriorated in slice communication using the network slice is determined. In such a case, groups of routers located on routes between the RANs 32 and the core network systems 34 (in the examples described above, routes between the gNBs 102 and the UPEs 50) may be identified.

In the present embodiment, for each network slice available to function elements (for example, the UPFs 50) included in the core network systems whether performance of function elements has deteriorated in slice communication using the network slice may be determined. Groups of routers located on routes between the RANs 32 and the core network systems 34 may then be identified. In such a case, whether performance of the UPFs 50 in slice communication using a network slice has deteriorated may be determined based on, for example, performance index values about the UPFs 50.

The present invention is applicable also to estimation of a router that is a cause of a silent failure in a network slice in a route other than the routes between the RANs 32 and the core network systems 34.

For example, a router that is a cause of a silent failure in a network slice in one of routes (midhaul) between the CUs 44 and the DUs 42 may be estimated.

In such a case, the policy manager 90 may determine, for each network slice available to one of the CUs 44, whether performance of the CU 44 in slice communication using the network slice has deteriorated. The policy manager 90 may then identify, for each one of a plurality of CUs 44 that are determined to have deteriorated in performance in slice communication, a group of routers located on a route of the slice communication between the one of the CUs 44 and one of the DUs 42. At least one router included in every router group identified in such a manner may be estimated to be a router that is a cause of the deterioration of performance of the CUs 44.

A value of the performance index value data may be a value indicating performance of a function element on the user plane, or a value indicating performance of a function element on the control plane. In such a case, the bearer connection completion ratio, the abnormal disconnection count, and the abnormal disconnection ratio described above, for example, correspond to indices of performance of a function element on the user plane. Examples of indices of performance of a function element on the control plane include a registration success ratio.

In a case of determining whether performance of a function element on the user plane has deteriorated, a router that is a cause of the deterioration of performance of the function element may be estimated from a group of routers that are components of the user plane.

In a case of determining whether performance of a function element on the control plane has deteriorated, a router that is a cause of the deterioration of performance of the function element may be estimated from a group of routers that are components of the control plane.

A router that is a cause of deterioration of performance of a function element may be estimated from a group of routers that are components of the control plane and a group of routers that are components of the user plane even in determination about performance of a function element on the control plane.

It is not required to identify, for each of a plurality of function elements determined to have deteriorated in performance in slice communication, a group of routers including all routers located on a route of the slice communication. Instead, a group of routers that are components of one or a plurality of network slice subnet instances may be identified out of the group of routers located on the route of the slice communication. For example, a group of routers in a backhaul part on the route may be identified. To give another example, a group of routers in a midhaul part on the route may be identified.

Figure 11:
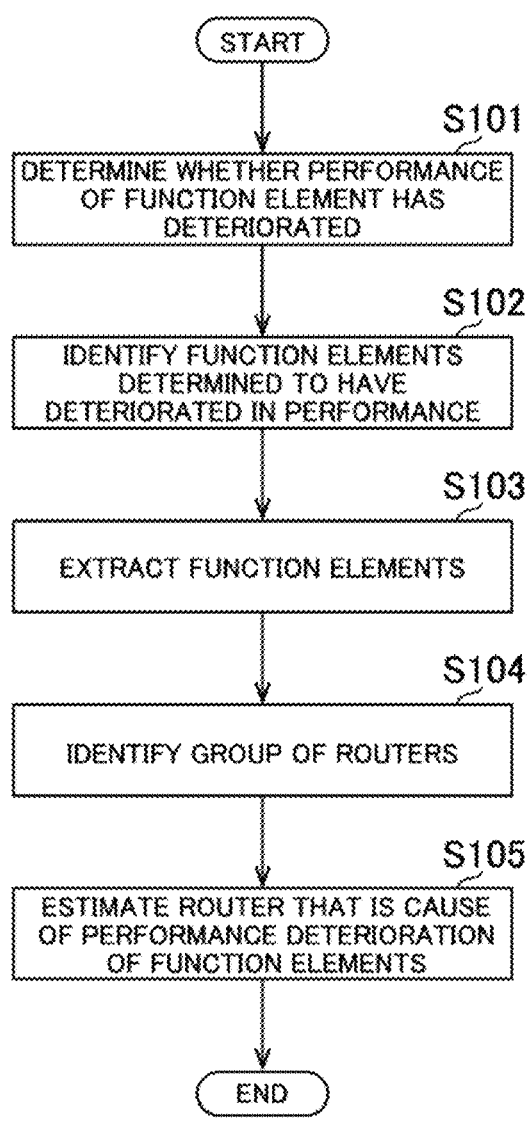
FIG. 11 is a flow chart for illustrating an example of a flow of a process performed by the platform system in the one embodiment of the present invention.

An example of a flow of a process executed in the platform system 30 in the present embodiment to estimate a router that is a cause of deterioration of performance of a function element is described with reference to a flow chart exemplified in FIG. 11.

First, the policy manager 90 determines, for each of the plurality of function elements included in the communication system 1, and for each network slice available to the function element, whether performance of the function element in slice communication using the network slice has deteriorated (Step S101).

The policy manager 90 then identifies a plurality of function elements determined in the process step of Step S101 to have deteriorated in performance in the slice communication (Step S102).

The policy manager 90 then extracts, from the plurality of function elements identified in the process step of Step S102, a plurality of function elements that are similar to one another in terms of shifts in performance in slice communication (Step S103).

The policy manager 90 then identifies, for each of the plurality of function elements extracted in the process step of Step S103, a group of routers located on a route of the slice communication (Step S104).

At least one router included in every group of routers identified in the process step of Step S104 is then estimated to be the router that is the cause of the deterioration of performance of the plurality of function elements extracted in the process step of Step S103 (Step S105). Then, the process illustrated in the process example is ended.

It should be noted that the present invention is not limited to the above-mentioned embodiment.

For example, the functional unit in the present embodiment is not limited to those illustrated in FIG. 3.

Further, the functional unit in the present embodiment is not required to be an NF in 5G. For example, the functional unit in the present embodiment may be an eNodeB, a vDU, a vCU, a packet data network gateway (P-GW), a serving gateway (S-GW), a mobility management entity (MME), a home subscriber server (HSS), or another network node in 4G.

Further, roles divided among the functions illustrated in FIG. 5 are not limited to those described above.

Further, the functional unit in the present embodiment may be implemented through use of a hypervisor-type or host-type virtualization technology instead of the container-type virtualization technology. Further, the functional unit in the present embodiment is not required to be implemented by software, and may be implemented by hardware, for example, by an electronic circuit. Further, the functional unit in the present embodiment may be implemented by a combination of an electronic circuit and software.

The technology described in the present disclosure can also be expressed as follows.

[1]

A router estimation system, including:
router group data storing means that stores, for each one of a plurality of network slices constructed in a communication system, router group data indicating a group of routers that form the each one of the plurality of network slices;
determination means that determines, for each one of a plurality of function elements included in the communication system, and for each network slice available to the each one of the plurality of function elements, whether performance of the each one of the plurality of function elements in slice communication using the each network slice has deteriorated;

extraction means that extracts, when it is determined that a plurality of function elements out of the plurality of function elements included in the communication system have deteriorated in performance in the slice communication, a plurality of function elements that are similar to one another in terms of shifts in performance in the slice communication from the plurality of function elements determined to have deteriorated in performance;

router group identification means that identifies, for each of the plurality of extracted function elements, a group of routers located on a route of the slice communication based on the router group data; and router estimation means that estimates at least one router included in every router group identified for the each of the plurality of extracted function elements to be a router that is a cause of the deterioration of performance of the plurality of extracted function elements.

[2]

The router estimation system according to Item [1], wherein the extraction means extracts, when it is determined that the plurality of function elements out of the plurality of function elements included in the communication system have deteriorated in performance in the slice communication, a plurality of function elements that are similar to one another in terms of shifts in performance in a period of the same period type as a period type to which timing of the determination belongs from the plurality of function elements determined to have deteriorated in performance.

[3]

The router estimation system according to Item [1] or [2], further including similarity degree calculation means that calculates a degree of similarity between shifts in performance of a first function element, which is one of the plurality of function elements included in the communication system, in slice communication using a network slice available to the first function element and shifts in performance of a second function element, which is another of the plurality of function elements included in the communication system, in slice communication using a network slice available to the second function element, wherein the extraction means extracts the plurality of function elements based on the calculated degree of similarity.

[4]

The router estimation system according to Item [3], wherein the similarity degree calculation means calculates, in response to the determination that the plurality of function elements have deteriorated in performance in the slice communication, for each pair of function elements out of the plurality of function elements determined to have deteriorated in performance, the degree of similarity between shifts in performance of the pair of function elements in the slice communication.

[5]

The router estimation system according to Item [3], wherein the extraction means extracts the plurality of function elements based on the degree of similarity calculated prior to the determination that the performance has deteriorated.

[6]

The router estimation system according to any one of Items [3] to [5], wherein the determination means determines whether performance of the each one of the plurality of function elements in slice communication has deteriorated based on a performance index value indicating performance of the each one of the plurality of function elements in the slice communication, and wherein the similarity degree calculation means calculates the degree of similarity based on a time series of the performance index value.

[7]

The router estimation system according to any one of Items [3] to [5], wherein the determination means determines whether performance of the each one of the plurality of function elements in slice communication has deteriorated based on a performance index value indicating performance of the each one of the plurality of function elements in the slice communication, and wherein the similarity degree calculation means calculates the degree of similarity based on a time series of a performance index value that is of a type different from a type of the performance index value used by the determination means.

[8]

The router estimation system according to any one of Items [1] to [7], wherein the determination means determines that the each one of the plurality of function elements has deteriorated in performance in the slice communication when a performance index value indicating performance of the each one of the plurality of function elements in the slice communication satisfies a predetermined condition for a predetermined period.

[9]

The router estimation system according to any one of Items [1] to [8], wherein the determination means repeatedly determines whether performance of the each one of the plurality of function elements in the slice communication has deteriorated, and wherein the extraction means extracts the plurality of function elements that are similar to one another in terms of shifts in performance in the slice communication from the plurality of function elements determined at least once to have deteriorated in performance out of an immediate last predetermined number of times the determination is executed.

[10]

The router estimation system according to any one of Items [1] to [9], wherein the router estimation means excludes, for each one of function elements that are unextracted from the plurality of function elements determined to have deteriorated in performance in the slice communication, routers located on a route of the slice communication of the each one of the unextracted function elements from routers estimated to be a cause of deterioration of performance of the plurality of function elements.

[11]

The router estimation system according to any one of Items [1] to [10], wherein the determination means determines, for each function element included in a radio access network of the communication system out of the plurality of function elements included in the communication system, and for each network slice available to the each function element, whether performance of the each function element in slice communication using the each network slice has deteriorated, and wherein the router group identification means identifies the group of routers located on a route between the radio access network and a core network system of the communication system.

[12]

The router estimation system according to any one of Items [1] to [10],
wherein the determination means determines, for each function element included in a core network system of the communication system out of the plurality of function elements included in the communication system, and for each network slice available to the each function element, whether performance of the each function element in slice communication using the each network slice has deteriorated, and
wherein the router group identification means identifies the group of routers located on a route between the core network system and a radio access network of the communication system.

[13]

The router estimation system according to any one of Items [1] to [10],
wherein the determination means determines, for each network slice available to a central unit (CU), whether performance of the CU in slice communication using the each network slice has deteriorated, and
wherein the router group identification means identifies the group of routers located on a route between the CU and a distributed unit (DU) included in the communication system.

[14]

The router estimation system according to any one of Items [1] to [13], wherein the route is a route on which a packet is forwarded by segment routing.

[15]

The router estimation system according to any one of Items [1] to [14], wherein the each one of the plurality of function elements is a network service or a network function.

[16]

A router estimation method, including:
storing, for each one of a plurality of network slices constructed in a communication system, r group data indicating a group of routers that form the each one of the plurality of network slices;
determining, for each one of a plurality of function elements included in the communication system, and for each network slice available to the each one of the plurality of function elements, whether performance of the each one of the plurality of function elements in slice communication using the each network slice has deteriorated;
extracting, when it is determined that a plurality of function elements out of the plurality of function elements included in the communication system have deteriorated in performance in the slice communication, a plurality of function elements that are similar to one another in terms of shifts in performance in the slice communication from the plurality of function elements determined to have deteriorated in performance;
identifying, for each of the plurality of extracted function elements, a group of routers located on a route of the slice communication based on the router group data; and
estimating at least one router included in every router group identified for the each of the plurality of extracted function elements to be a router that is a cause of the deterioration of performance of the plurality of extracted function elements.

The invention claimed is:

1. A router estimation system, comprising one or more processors, the router estimation system causing at least one of the one or more processors to execute:
a router group data storing process of storing, for each one of a plurality of network slices constructed in a communication system, router group data indicating a group of routers that form the each one of the plurality of network slices;
a determination process of determining, for each one of a first plurality of function elements included in the communication system, and for each network slice available to the each one of the first plurality of function elements, whether performance of the each one of the first plurality of function elements in slice communication using the each network slice has deteriorated;
an extraction process of extracting, when it is determined that a second plurality of function elements out of the first plurality of function elements included in the communication system have deteriorated in performance in the slice communication, a third plurality of function elements that are correlated to one another in terms of shifts in performance in the slice communication from the second plurality of function elements determined to have deteriorated in performance;
a router group identification process of identifying, for each of the third plurality of function elements, a group of routers located on a route of the slice communication based on the router group data; and
a router estimation process of estimating at least one router included in every router group identified for the each of the third plurality of function elements to be a router that is a cause of the deterioration of performance of the third plurality of function elements.

2. The router estimation system according to claim 1, wherein, in the extraction process, when it is determined that the second plurality of function elements out of the first plurality of function elements included in the communication system have deteriorated in performance in the slice communication, function elements that are correlated to one another in terms of shifts in performance in a period of the same period type as a period type to which timing of the determination belongs are extracted, as the third plurality of function elements, from the second plurality of function elements determined to have deteriorated in performance.

3. The router estimation system according to claim 1,
wherein the router estimation system causes the at least one of the one or more processors to execute a correlation calculation process of calculating a correlation between shifts in performance of a first function element, which is one of the second plurality of function elements included in the communication system, in slice communication using a network slice available to the first function element and shifts in performance of a second function element, which is another of the second plurality of function elements included in the communication system, in slice communication using a network slice available to the second function element, and
wherein, in the extraction process, the third plurality of function elements are extracted based on the calculated correlation.

4. The router estimation system according to claim 3, wherein, in the correlation calculation process, in response to the determination that the second plurality of function elements have deteriorated in performance in the slice communication, for each pair of function elements out of the second plurality of function elements determined to have deteriorated in performance, the correlation between shifts in performance of the pair of function elements in the slice communication is calculated.

5. The router estimation system according to claim 3, wherein, in the extraction process, the third plurality of function elements are extracted based on the correlation calculated prior to the determination that the performance has deteriorated.

6. The router estimation system according to claim 3,
wherein, in the determination process, whether performance of the each one of the first plurality of function elements in slice communication has deteriorated is determined based on a performance index value indicating performance of the each one of the first plurality of function elements in the slice communication, and
wherein, in the correlation calculation process, the correlation is calculated based on a time series of the performance index value.

7. The router estimation system according to claim 3,
wherein, in the determination process, whether performance of the each one of the first plurality of function elements in slice communication has deteriorated is determined based on a performance index value indicating performance of the each one of the first plurality of function elements in the slice communication, and
wherein, in the correlation calculation process, the correlation is calculated based on a time series of a performance index value that is of a type different from a type of the performance index value of the determination process.

8. The router estimation system according to claim 1, wherein, in the determination process, the each one of the first plurality of function elements is determined to have deteriorated in performance in the slice communication when a performance index value indicating performance of the each one of the first plurality of function elements in the slice communication satisfies a predetermined condition for a predetermined period.

9. The router estimation system according to claim 1,
wherein, in the determination process, whether performance of the each one of the first plurality of function elements in the slice communication has deteriorated is repeatedly determined, and
wherein, in the extraction process, the third plurality of function elements that are correlated to one another in terms of shifts in performance in the slice communication are extracted from the second plurality of function elements determined at least once to have deteriorated in performance out of an immediate last predetermined number of times the determination is executed.

10. The router estimation system according to claim 1, wherein, in the router estimation process, for each one of function elements that are unextracted from the second plurality of function elements determined to have deteriorated in performance in the slice communication, routers located on a route of the slice communication of the each one of the unextracted function elements are excluded from routers estimated to be a cause of deterioration of performance of the second plurality of function elements.

11. The router estimation system according to claim 1,
wherein, in the determination process, for each function element included in a radio access network of the communication system out of the first plurality of function elements included in the communication system, and for each network slice available to the each function element, whether performance of the each function element in slice communication using the each network slice has deteriorated is determined, and
wherein, in the router group identification process, the group of routers located on a route between the radio access network and a core network system of the communication system is identified.

12. The router estimation system according to claim 1,
wherein, in the determination process, for each function element included in a core network system of the communication system out of the first plurality of function elements included in the communication system, and for each network slice available to the each function element, whether performance of the each function element in slice communication using the each network slice has deteriorated is determined, and
wherein, in the router group identification process, the group of routers located on a route between the core network system and a radio access network of the communication system is identified.

13. The router estimation system according to claim 1,
wherein, in the determination process, for each network slice available to a central unit (CU), whether performance of the CU in slice communication using the each network slice has deteriorated is determined, and
wherein, in the router group identification process, the group of routers located on a route between the CU and a distributed unit (DU) included in the communication system is identified.

14. The router estimation system according to claim 1, wherein the route is a route on which a packet is forwarded by segment routing.

15. The router estimation system according to claim 1, wherein the each one of the first plurality of function elements is a network service or a network function.

16. A router estimation method, comprising:
storing, for each one of a plurality of network slices constructed in a communication system, router group data indicating a group of routers that form the each one of the plurality of network slices;
determining, for each one of a first plurality of function elements included in the communication system, and for each network slice available to the each one of the first plurality of function elements, whether performance of the each one of the first plurality of function elements in slice communication using the each network slice has deteriorated;
extracting, when it is determined that a second plurality of function elements out of the first plurality of function elements included in the communication system have deteriorated in performance in the slice communication, a third plurality of function elements that are correlated to one another in terms of shifts in performance in the slice communication from the second plurality of function elements determined to have deteriorated in performance;
identifying, for each of the third plurality of function elements, a group of routers located on a route of the slice communication based on the router group data; and estimating at least one router included in every router group identified for the each of the third plurality of function elements to be a router that is a cause of the deterioration of performance of the third plurality of function elements.

17. The router estimation system according to claim 1, wherein the extraction process of extracting the third plurality of function elements that are correlated to one another in terms of shifts in performance in the slice communication includes:
calculation of a correlation coefficient of the shifts in performance in the slice communication of the third plurality of function elements.

18. The router estimation system according to claim 1, wherein the extraction process of extracting the third plurality of function elements that are correlated to one another in terms of shifts in performance in the slice communication includes:
calculation of a reciprocal of a square sum of differences of the shifts in performance in the slice communication of the third plurality of function elements.

* * * * *